United States Patent
Tropper

(10) Patent No.: US 10,440,548 B2
(45) Date of Patent: *Oct. 8, 2019

(54) MPERS WITH INTERNAL CONVERSION OF GPS

(71) Applicant: David Tropper, Fresh Meadows, NY (US)

(72) Inventor: David Tropper, Fresh Meadows, NY (US)

(73) Assignee: TBD SAFETY, LLC, Lewes, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/801,907

(22) Filed: Nov. 2, 2017

(65) Prior Publication Data

US 2018/0124588 A1 May 3, 2018

Related U.S. Application Data

(60) Provisional application No. 62/416,580, filed on Nov. 2, 2016.

(51) Int. Cl.
*H04W 4/90* (2018.01)
*H04M 3/51* (2006.01)
*H04W 76/50* (2018.01)

(52) U.S. Cl.
CPC .......... *H04W 4/90* (2018.02); *H04M 3/5116* (2013.01); *H04W 76/50* (2018.02); *H04M 2201/14* (2013.01); *H04M 2242/30* (2013.01)

(58) Field of Classification Search
CPC ............ H04W 4/90; H04W 4/70; H04L 12/66
See application file for complete search history.

(56) References Cited

U.S. PATENT DOCUMENTS

| | | | |
|---|---|---|---|
| 5,465,388 A * | 11/1995 | Zicker | H04M 11/04 455/404.1 |
| 9,818,280 B2 | 11/2017 | Mangum | |
| 10,180,489 B2 * | 1/2019 | Tropper | H04W 4/90 |
| 2004/0091085 A1 * | 5/2004 | Suganuma | H04L 12/66 379/45 |
| 2010/0003958 A1 | 1/2010 | Ray | |
| 2011/0111728 A1 | 5/2011 | Ferguson | |
| 2011/0319048 A1 | 12/2011 | Matlock | |
| 2013/0178206 A1 * | 7/2013 | Singhal | H04W 40/00 455/435.1 |
| 2015/0065082 A1 | 3/2015 | Sehgal | |
| 2016/0094953 A1 * | 3/2016 | Russ | H04W 4/70 455/404.2 |
| 2016/0286355 A1 | 9/2016 | Shur | |
| 2018/0120409 A1 | 5/2018 | Tropper | |

* cited by examiner

*Primary Examiner* — Myron Wyche
(74) *Attorney, Agent, or Firm* — Gordon Feinblatt LLC; Royal W. Craig

(57) ABSTRACT

A unit transmits a call initiate signal over a communication network in response to the switch moving from the inactive position to the active position to establish a call with a 911 emergency service operator directly and enable voice communication. The unit is equipped to send a message indicative of ascertained location information of the unit to the 911 emergency service operator at an end of the established call. The unit contacts remote source to ascertain the location information and form the message. The unit maintains establishment of the call at least until the message is sent to the 911 emergency service operator. The unit itself lacks any GPS tracking module.

6 Claims, 7 Drawing Sheets

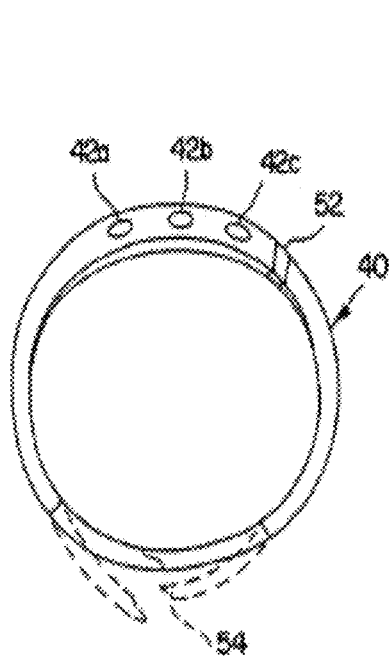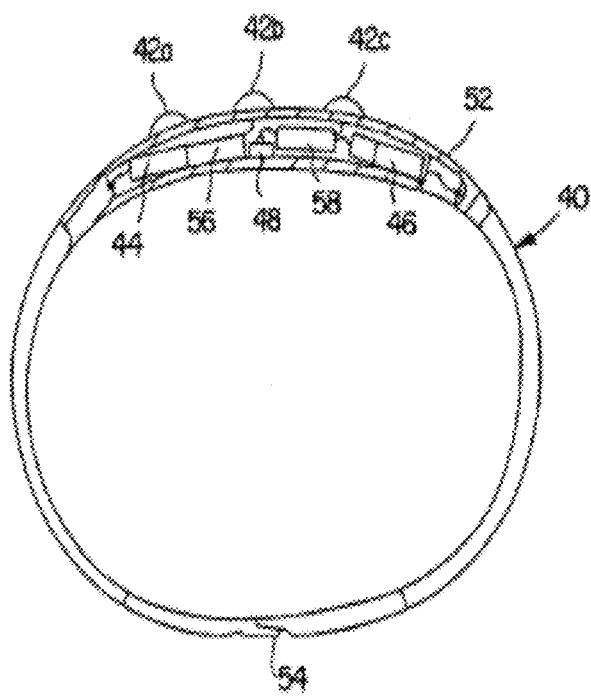
FIG. 3A
(PRIOR ART)
FIG. 3B
(PRIOR ART)

MPERS WITH INTERNAL CONVERSION OF GPS

CROSS-REFERENCE TO COPENDING PATENT APPLICATIONS

The present application claims priority from provisional patent application No. 62/416,580 filed Nov. 2, 2016.

BACKGROUND OF THE INVENTION

Field of the Invention

The invention relates to a personal emergency response device or unit that makes connection with a 911 emergency service operator directly without being connected via a human operator at a central dispatch station. The device retrieves location information of the device and transmits the location information as a message to the 911 emergency service operator without permitting the call to terminate before the message has been sent.

Discussion of Related Art

As mentioned in U.S. Pat. No. 9,235,972:

> Today's technology provides us with public services such as the 911 telephone number for rapidly summoning emergency help if we are able to access a telephone, dial the number, and communicate our location. However, these services fall short in the case of a young child, a mentally incompetent or medically incapacitated person, someone lost in the woods, or the victim of an abduction or kidnapping. These situations necessitate a security system that travels with the individual, is not limited in range, is able to define and signal an emergency situation without human intervention, and identifies the individual's location. Such a system would provide protection to the individual and peace of mind to those responsible for his or her care and well being.

The following is an excerpt from https://www.theseniorlist.com/2013/05/a-list-of-mobile-cellular-based-medical-alert-system-providers/. It reads:

> The new mobile personal emergency response systems (mPERS) are not tethered to a land-line like traditional in-home devices. They operate on the same cellular signal that mobile phones do, offering mobility anywhere there is a cell signal . . . . For example, Verizon Wireless will allow you to purchase the SureResponse device for $19 IF you are willing to enter into a 2 year agreement. Similarly, a number of providers will offer a 1 or 2 year agreement (with payment up-front naturally) and reduce your overall monthly costs during the term of the agreement. We don't like long-term agreements (for a lot of reasons) but it may be suitable for your individual situation. Just like anything, you have to make the best choice for you or your loved one. We're just trying to make the process a little easier.

It was such long-term agreements that motivated the present inventor to devise a personal emergency response system that avoided a central dispatch center altogether and thereby eliminate the need for on-going monitoring support and its associated cost. Such conventional arrangements rely on a central dispatch center as the on-going monitoring support to confirm that an emergency exists from the personal emergency response system user before the central dispatch center calls a 911 emergency service operator to establish a call between the user and the 911 emergency service operator.

It is desired to eliminate a central dispatch station from intervening between a person seeking emergency assistance and a 911 emergency service.

SUMMARY OF THE INVENTION

One aspect of the invention relates to a personal emergency response device that is manually activated to initiate a call by emitting a call initiation signal to a 911 emergency service operator directly to enable voice communication between the device and the 911 emergency service operation over a communication network and to emit a location information signal (actually a voice file) indicative of a location of the device at an end of the call in a manner that prevents termination of the call prior the location information signal being emitted. The device is configured to obtain location information by interfacing with an online location identification service such as Google Maps and/or from triangulation with cell tower servicer network devices based in part on signal strength.

BRIEF DESCRIPTION OF THE DRAWING

FIGS. 3A and 3B are isometric views of a conventional remote alarm switch unit, but which is included in the personal security and tracking system of FIG. 1;

DETAILED DESCRIPTION OF THE INVENTION

I. The present invention is a modification of any conventional personal emergency response device that is used to establish a call with a central dispatch station. The present invention eliminates the need for the central dispatch station by instead establishing a call directly with a 911 emergency service operator and sending that operator a message with location information of the device prior to terminating the call. Also allows the 911 operator to prompt the device to send the location by pressing a key tone.

The present invention may be viewed as a portable device that is a modification of any conventional personal security and tracking system such as that of U.S. Pat. No. 9,235,972 by dispensing with modules responsible for a cellular telephone Automatic Location Identification System, Global Positioning System, LORAN-C and GLONAS. Instead, the present invention interfaces with an online mapping site such as Google Maps to retrieve location information and may implement triangulation with nearby cellular towers based on signal strength differences to determine location information of the portable device of the present invention. Further, the present invention dispenses with the need for a central dispatch station of U.S. Pat. No. 9,235,872 or other type of central dispatch station by instead establishing a call over a communication network directly with a 911 emergency service operator without any intervention from a central dispatch station. The location information, which is ascertained either from the online mapping site and/or from the triangulation, is sent as a message to the 911 emergency service operator prior to termination of the call and may do so by preventing the call from terminating before the message is sent.

Figure 1A:
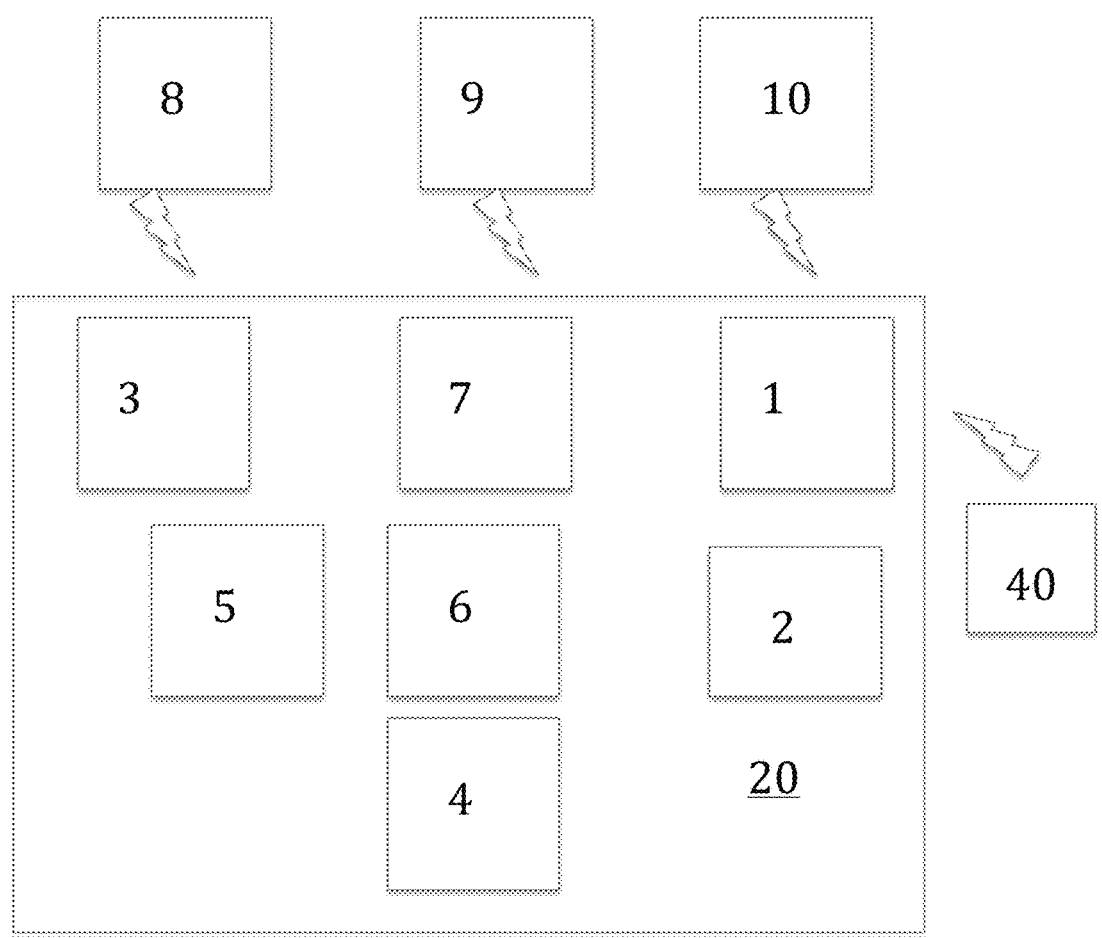
FIG. 1A is a schematic of a personal security and tracking system in accordance with an embodiment of the present invention.

FIG. 1A is a personal security and tracking system of the present invention that includes a portable emergency response unit 20 and a remote alarm switch unit 40. Either may be in communication with a conventional base station that is equipped to establish a call over a communication network. It is preferred that the portable emergency response 30 be so equipped, thereby obviating the need for the base station.

The portable emergency response unit 20 or mobile personal (MPERS) 20 has conventional components: an emergency (SOS) switch 1, a locator switch 2, a cellular module 3 for establishing wireless communications over a network, a power source 4 such as replaceable batteries in a battery compartment holder, a speaker 5 to listen to communications, a microphone 6 to send voice communications, and a transmitter 7 to send and receive signal transmissions to effect the communications.

The cellular module 3 is equipped with a global positioning system (GPS) chip.

The mobile personal unit (MPERS) 20 communicates via the cellular module 3 with a conventional server 8 and a conventional 911 emergency service center 10. The personal security and tracking system of the present invention may also include the remote alarm switch unit 40 that communicates with the portable emergency response unit 20 and with a conventional base station. The MPERS 20 may optionally communicate also with a conventional GPS server 9 if necessary to obtain location coordinates in the event it is unable to do so from its own database.

The switch 1 can be moved between active and inactive positions (e.g., on or off). The switch 1 is exemplified by any conventional switch, such as, but not limited to, a button that can be depressed to activate and then released, a slide that can be slid to activate and then released and a lever that can be swung about a pivot to activate and then released. The button, slide or lever may either be retained in the activated position if so constructed with any conventional way of doing so or could instead be spring loaded to return to its original position, again constructed with any conventional way of doing so, and require a repeat of the same movement to deactivate.

Once the manually operative switch 1 is moved into an activated position, the personal emergency response unit 20 transmits a signal via the transmitter 4 that will ultimately lead to establishing voice communication over a conventional communication network with a 911 emergency service operator at a 911 emergency call center 10. That is, the call is made directly to the actual 911 emergency service operator as opposed to a call dispatch center that fields such calls to confirm that an emergency exists before performing the necessary steps to establish a call with the actual 911 emergency service operator. The call with the 911 emergency service operator is established directly through transmission of the signal over the conventional communication network.

In addition, the GPS chip of the cellular module 3 is responsible for processing the GPS coordinate information from GPS satellites to obtain address information corresponding to the latitude/longitude coordinates that are based on the GPS coordinate information received. This arises because the GPS server 9 contains programming that is the same or substantially the same as that found in a conventional online mapping site such as Google maps that can convert the latitude/longitude coordinates into address information. Such address information is then sent as a message to the 911 emergency service operator either in response to the user activating the locator switch 2 or at the end of the call before termination.

However, the cell module 3 and the 911 emergency service center 10 can no longer disconnect from each until after the ascertained address information has been transmitted as a message to the connected operator of the 911 emergency service center 10 or has otherwise been announced to the 911 emergency service operator. During the call, the user may activate a locator switch 2 at any time to have the ascertained location information updated and announced in the phone call again.

The MPERS unit 20 is powered by replaceable batteries, which are placed in a holder 6 in the personal emergency response unit 20.

According to http://sociable.co/technology/how-to-easily-find-any-locations-coordinates-with-the-google-maps-app/, the GOOGLE maps app provide any location's coordinates of latitude and longitude by pursuing the following steps: Obtain the general location by searching for a structure corresponding to one's location. Once you have the general location then you can find the specific coordinates. Zoom into the location as far as the app will allow, then press and hold on the place you want the coordinates for. The app will then show you the name of the nearest point of interest, click on this. On the information screen select the option "Share this place"—you'll then be given some share options for the location. Once you do this, the app will generate a short link (goo.gl) for this location (in our case, this link). This link will then show you the absolute coordinates for the location you want.

Figure 1B:
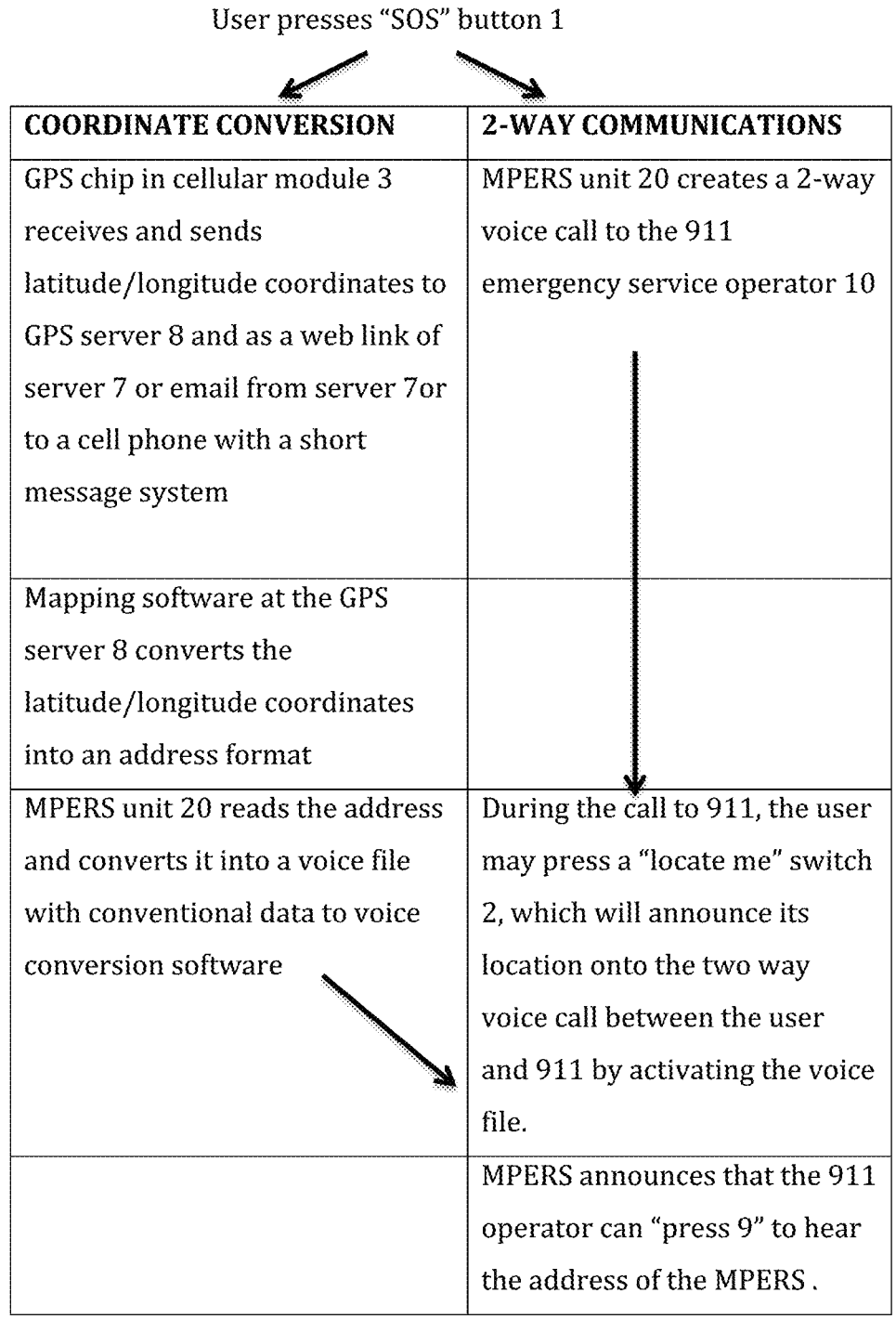
FIG. 1B is a flow chart of the operation of the personal security and tracking system of FIG. 1A.

Referring to FIG. 1B, operation of the personal emergency response system of FIG. 1 is via steps as follows:

A. User presses "SOS" button on the personal emergency response unit 20 (mobile personal emergency response system—MPERS).

B. "SOS" Button initiates the GPS chip to convert the received latitude/longitude coordinates from the GPS coordinate information into corresponding address information in address format by accessing a database within the MPERS or unit 20. The database may be the same or substantially the same (as far as content is concerned) as that found in online mapping websites such as that of Google Maps.

C. The MPERS or unit 20 reads the address format and converts it into a voice file with conventional data to voice conversion software.

D. When the "SOS" button 1 is pushed, the unit 20 will also create a 2-way voice call to the 911 emergency service operator ("911") 10 that allows the user to listen via speakers 4 and transmit voice via microphone 5.

E. During the call to 911, the user has an option to press a "locate me" button 2 to announce its location. Alternatively, to avoid confusion, the button 2 may be dispensed with and its function handled by the "SOS" button 1 in which case there will be only one button. Thus, by pressing the "SOS" button, it will announce the location also, as well as announce its location onto the two way voice call between the user and 911 by activating the voice file created in step E.

F. The MPERS is programmed to play the voice file when the user attempts to disconnect the call with 911, thus preventing the user from terminating the call without the location announcement being played for the 911 operator to hear.

G. The cell module 3 is also programmed to send out the coordinates as a web link to a predetermined ip address associated with the server 7 or to an email address or to a cell phone as a short message service (sms) message.

H. The unit 20 or MPERS is also programmed to play the location via the voice file when prompted to by pressing a predetermined tone such as "press 9" to locate this device.

I. The unit 20 or MPERS will play an announcement indicating that the 911 operator can "press 9" to hear the address of the MPERS.

The contents of U.S. Pat. No. 9,235,972 are incorporated herein in its entirety including its drawings and description thereof. The following italicized portions are some excerpts:

A signaling system is provided for rendering an alarm for an individual in distress combined with a locating and tracking system to thus alert and direct appropriate personnel to the needs of the individual in distress and to monitor the location of that individual. The system comprises a portable emergency response unit, a remote alarm switch device, a central dispatch station, and makes use of a wireless communication system. The portable emergency response unit and the remote alarm switch may be adapted to be worn at different locations on the person's body. The remote alarm switch way be concealed in the form of a wristband or in the form of any other object such as a broach, pendant, or keychain.

Figure 2:
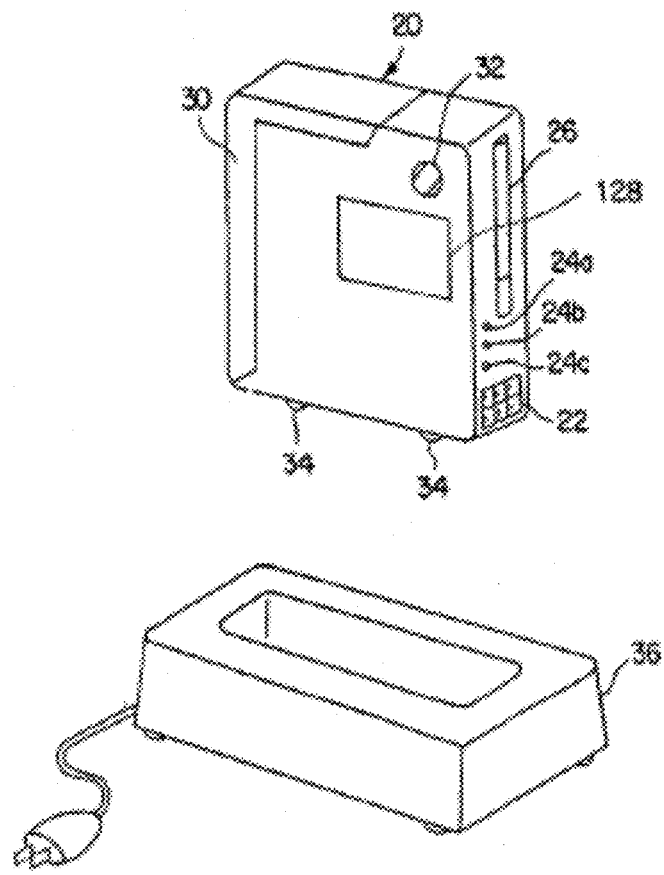
FIG. 2 is an isometric view of a conventional portable emergency response unit, but which is included in the personal security and tracking system of FIG. 1.

FIG. 2 shows a portable emergency response unit 20 that includes a main power on off keypad 22. Local alarm push button switches 24a, 24b, 24c, etc. allow the use of the portable emergency response unit 20 by campers, hikers, or skiers, etc., when the additional features of the remote alarm switch unit 40 may not be required. A cellular telephone antenna 26 is embodied in the casing of the emergency response unit 20. In another variation, provision could be made to accommodate a GPS receiving antenna 30 in the outer part of the casing of emergency response unit 20 when a GPS receiver is used for determining the location of the emergency response unit. A speaker microphone element 32 provides the option to conduct two way voice communications. Two electrical contacts 34 are mounted to the base for use with a drop in battery charger 36, as known in the art of portable communications systems. Portable emergency response unit 20 can be manufactured in various configurations for attaching it securely to the individual, including by use of a belt, belt clip, or carry strap. Another variation of the configuration could incorporate a sensor to detect if the portable emergency response unit 20 was involuntarily removed from the individual and would automatically trigger an alarm signal to the central dispatch station.

FIGS. 3A and 3B show one embodiment of the remote alarm switch unit 40 in the form of a wristband assembly. Remote alarm switch unit 40 can be in the form of any other object, such as a broach, pendant, or keychain. Regardless of its construction, remote alarm switch unit 40 comprises a series of manual alarm push buttons 42a, 42b, 42c, etc. These manual alarm push buttons can be marked with different symbols and/or color codes for easy reference by the user. For example, green, yellow and red may be used to indicate increasing order of alarm priority.

Remote alarm switch unit 40 further comprises a miniature radio transmitter having a built in antenna 46, a lithium battery 48, an encoder circuit 58, and an automatic switch circuit 44 that is activated if remote alarm switch unit 40 is removed from individual 50 by forceful or unauthorized means. In the wristband configuration of remote alarm switch unit 40 as shown, a section of insulation material 52, e.g., non-electroconductive plastic, is provided so that the clasp portion 54 of the wristband can provide a closed circuit to the automatic alarm switch circuit 44. These components enable remote alarm switch unit 40 to automatically generate a signal if the circuit is determined to be open (e.g., when the remote alarm switch unit 40 is unintentionally removed from the individual).

Remote alarm switch unit 40 also comprises a timer circuit 56, which enables remote alarm switch unit 40 to transmit a periodic signal so that portable emergency response unit 20 can determine that remote alarm switch unit 40 is within the preset location range of portable emergency response unit 20 (i.e., a "normal" condition: the portable emergency response unit 20 is still being worn or carried by the individual).

Further, remote alarm switch unit 40 contains circuitry that enables remote alarm switch unit 40 to be in a non-transmitting mode when in a non triggered state, except during transmission of the periodic signals. In this way, battery power is conserved, unlike where remote alarm switch unit 40 is continuously transmitting in the triggered state.

Figure 4:
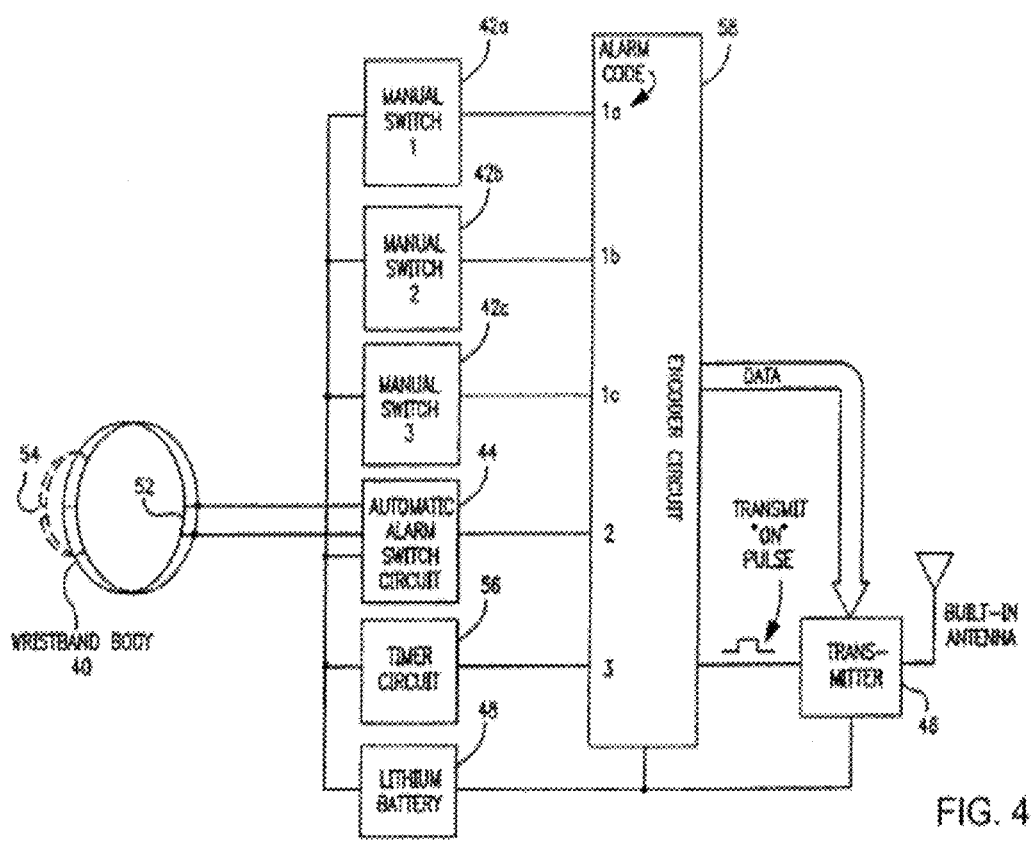
FIG. 4 is a block diagram of conventional major circuit components in the remote alarm switch unit of FIGS. 3A and 3B.

FIG. 4 shows a functional block diagram of the circuits in the remote alarm switch unit 40. The various manual alarm switches 42a, 42b, and 42c are shown. Also shown are automatic alarm switch circuit 44, encoder circuit 58, timer circuit 56, miniature radio transmitter having a built in antenna 46, and lithium battery 48.

Figure 5:
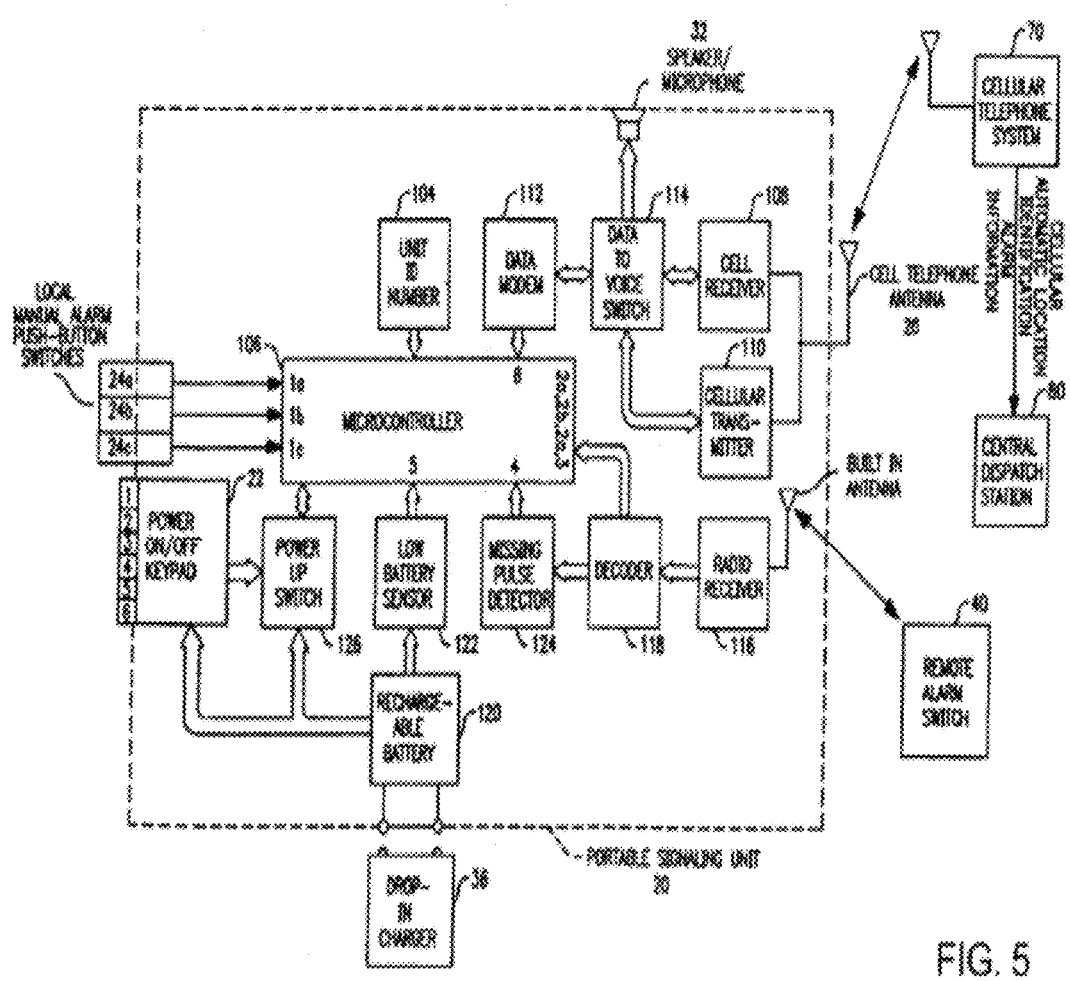
FIG. 5 is a block diagram of conventional major circuit components in the personal security and tracking system of FIG. 1 including a detailed block diagram of the portable emergency response unit of FIG. 2.

FIG. 5 shows a system block diagram which includes portable emergency response unit 20, drop in battery charger 36, a cellular telephone system 70 with wireless location technology such as a cellular telephone Automatic Location Identification (ALI) system, remote alarm switch unit 40, and central dispatch station 80. Contained within the portable emergency response unit 20 are 3 local alarm switches 24a, 24b, 24c, a programmed unit serial identification code circuit 104, a microcontroller 106, a cellular telephone receiver 108 with a pre assigned telephone number, a cellular telephone antenna 26, and a cellular telephone transmitter 110. The cellular telephone circuit 110 also comprises a pre programmed telephone number for the central dispatch station 80, a redial counter, and alternate telephone numbers to provide for failsafe operation. Also included in the portable emergency response unit are a data modem 112, a data-to-voice switching circuit 114, a remote alarm radio receiver with built in antenna 116, a decoder circuit 118, a speaker microphone element 32, a rechargeable battery 120, a low battery sensor circuit 122, a missing pulse detector 124, and a power up switch circuit 126.

The general method of operation of the personal security tracking system is described as follows:

The portable emergency response unit 20 can be worn or carried by the user, preferably under the wearer's clothing so as to not be visible to a possible perpetrator.

As shown in FIG. 5, the portable emergency response unit 20 is first put into service by an authorized person, parent, or guardian who enters a security code at the main power on/off key pad 22. The portable emergency response unit 20 is now in a stand by mode so as to conserve battery power. In the stand by mode only those circuits essential to sensing an alarm condition are powered on. These essential circuits include remote alarm radio receiver 116, decoder circuit 118, missing pulse detector 124, cellular telephone receiving circuit 108, data modem circuit 112, microcontroller 106 and a low battery sensing circuit 122. The microcontroller 106 continuously polls the alarm inputs to detect a change in security conditions. It also commands and directs circuit operations. The data-to-voice switch circuit 114 remains in the data mode and cannot be switched to the voice mode until it receives the power up command. The remainder of the circuits remain off until an alarm input is detected. The portable emergency response unit 20 is activated to the alarm mode when any one of the following conditions prevail:

(a) When the person in distress has enough control in the situation to manually activate the portable emergency response unit 20 (FIG. 2).

This is done by depressing any one of the manual pushbutton switches 24a, 24b, 24c, etc. on the portable emergency response unit 20. The selection of the proper manual push button switches 24a, 24b, 24c, etc. is related to various health conditions or a threat to the individual's personal safety, based on a pre arranged agreement with the central dispatch station. E.g., depressing manual alarm push button switch 24c can mean "I'm okay, just checking in, as pre arranged", depressing manual alarm push button switch 24b can mean "I am in need of medical assistance", and depressing manual alarm push button switch 24a can mean "Help, my life is in danger!"

Referring to FIG. 5, depressing any one of the pushbutton switches 24a, 24b, 24c, etc. on the portable emergency response unit 20 sends a signal to microcontroller 106 and sets alarm input number 1a, 1b, 1c, etc. corresponding to the manual switch that was depressed.

(b) When the person in distress has enough control in the situation to manually activate the remote alarm switch unit 40 (FIGS. 3A and 3B).

This is done by depressing any one of the manual push-button switches 42a, 42b, or 42c, etc. The selection of the proper manual alarm push button switch 42a, 42b or 42c, etc., is related to various, health conditions or a threat to the individual's personal safety, as described in paragraph (a) above.

Referring to FIG. 4, depressing any one of the push button switches 42a, 42b, or 42c, etc. on the remote alarm switch unit 40 sends a pulse to the encoder circuit 58. The encoder circuit 58 then sends a uniquely coded data pulse and a transmit "on" command to the miniature radio transmitter 46. In FIG. 5, a radio frequency signal, with the unique code denoting which manual switch was depressed, is sent from the remote alarm switch unit 40 to the portable emergency response unit 20. The signal is detected by the remote alarm radio receiver 116 and decoded by the decoder circuit 118. Decoder 118 sets alarm input number 2a, 2b, or 2c, etc. in the microcontroller 106 corresponding to the manual switch that was depressed in the remote alarm switch unit 40. Coding and decoding the remote alarm switch unit 40 signal will prevent false triggering of the portable emergency response unit 20 from other stray and random radio frequency sources.

(c) When the remote alarm switch unit 40 is removed from the individual 50 by forceful or unauthorized means before the individual is able to summon help.

In FIG. 4, the automatic alarm switch circuit 44 is activated when, in this example, the wristband clasp assembly 54 is opened, or if the wristband is cut or broken. In either case, the automatic alarm switch circuit 44 senses that electrical continuity around the wristband is broken creating an open electrical circuit. The automatic alarm switch circuit 44 then sends a pulse to the encoder circuit 58. The encoder circuit 58 sends a uniquely coded pulse and a transmit "on" command to the miniature radio transmitter 46. In FIG. 5, a radio frequency signal, with the unique code denoting the automatic alarm switch circuit 44 activation, is sent to the portable emergency response unit 20. The signal is detected by remote alarm radio receiver 116 and decoded by decoder circuit 118. Decoder 118 sets alarm input number 3 in the microcontroller 106.

(d) When the portable emergency response unit 20 is removed from the individual 50 by forceful or unauthorized means before the individual can summon help.

A feature of the portable security and tracking system provides for detecting the separation of the portable emergency response unit 20 from the remote alarm switch unit 40. A scenario might be where the portable emergency response unit 20 is removed from the individual 50 by a perpetrator and discarded and the remote alarm switch (in the form of a wristband for example) is untouched. Its operation is described as follows:

The portable emergency response unit 20 must receive a radio frequency signal from the remote alarm switch unit 40 at a predetermined time interval. A failure to receive this signal will activate the portable emergency response unit 20 to transmit an alarm. This failure to receive the signal may be when the distance between the portable emergency response unit 20 and the remote alarm switch unit 40 becomes too great to detect the signal or it may be caused by a battery or transmitter failure in the remote alarm switch unit 40.

In FIG. 4, the timer circuit 56 in remote alarm switch unit 40 sends a pulse to the encoder circuit 58 at a predetermined time interval, e.g., once every minute. The encoder circuit 58 sends a uniquely coded pulse and a short transmit "on" command to the miniature radio transmitter 46.

In FIG. 5, a radio frequency signal, with a unique code denoting a timer circuit activation, is sent to the portable emergency response unit 20. The signal is detected by remote alarm radio receiver circuit 116 in the portable emergency response unit 20. The unique code is decoded by the decoder circuit 118 and sent to missing pulse detector circuit 124. If missing pulse detector 124 fails to be reset within a predetermined time interval by the periodic signal, e.g., 1.5 minutes, then alarm input number 4 is set in microcontroller 106. The separation distance at which the portable emergency response unit 20 is activated is set by adjusting the power output of the miniature radio transmitter 46 in the remote alarm switch unit 40.

(e) When a low battery condition is sensed by the low battery sensor circuit 122.

In FIG. 5, the low battery sensor circuit 122 is preset to allow a sufficient amount of remaining battery voltage to ensure reliable activation of the portable emergency response unit 20. When the voltage drops below a preset voltage threshold, alarm input flag number 5 is set in the microcontroller 106.

(f) When the portable emergency response unit 20 needs to be located and/or monitored.

As shown in FIG. 5, the programmed unit identification code circuit 104, the cellular telephone transmitter circuit 110 and the data-to-voice switching circuit 114 are turned on.

II. The present invention is also a modification of any conventional personal emergency response device that is used to establish a call with a central dispatch station via a base station. The present invention eliminates the need for the central dispatch station by instead establishing a call directly with a 911 emergency service operator and sending that operator a message with location information of the device prior to terminating the call.

Figure 6:
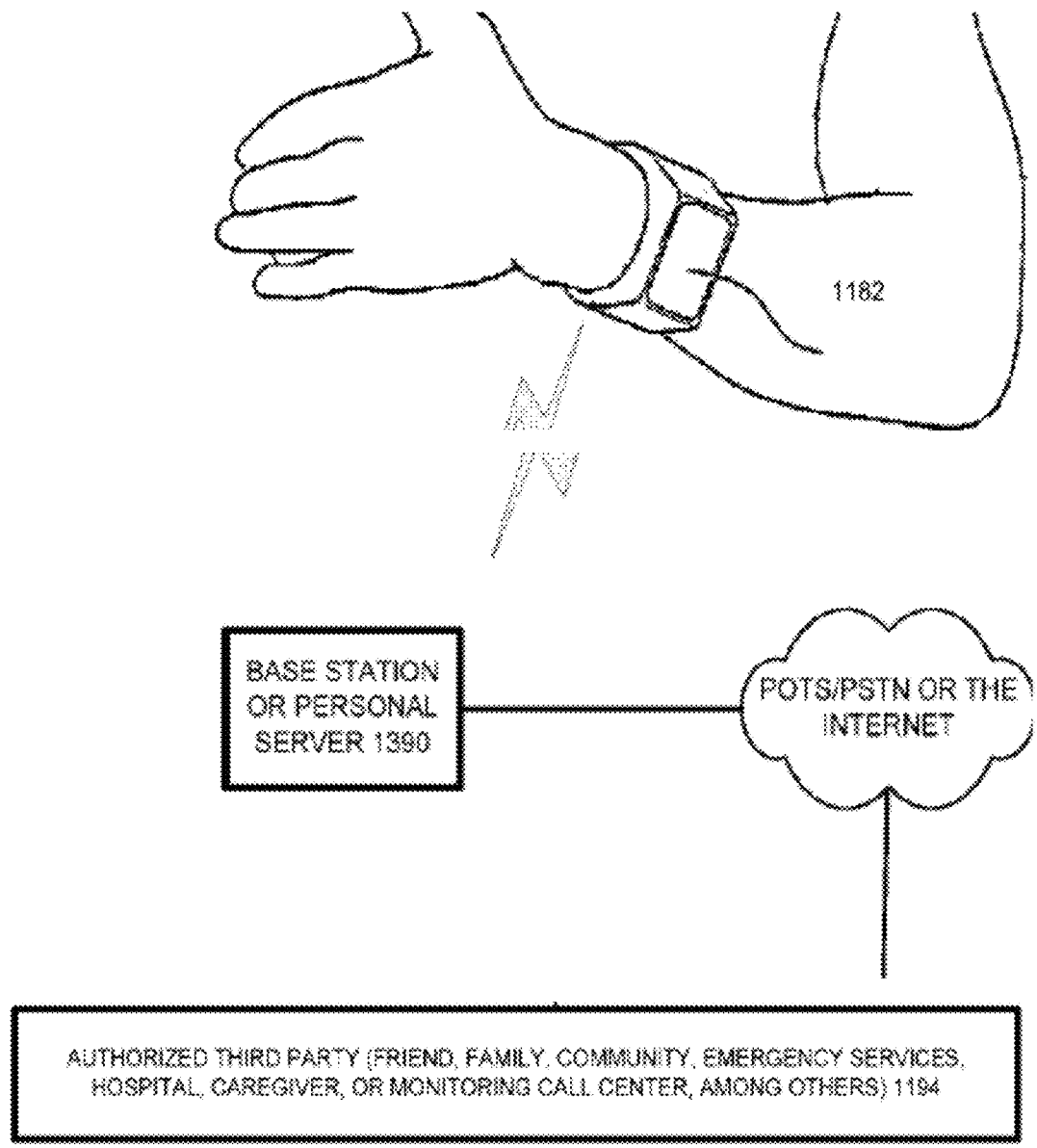
FIG. 6 is an isometric view of a conventional wrist-watch based assistance device.

The present invention may also be considered a modification of a personal emergency response system of the type mentioned in U.S. Pat. No. 8,747,336, whose contents are likewise incorporated in its entirety by reference. The following italicized portions are some excerpts:

*As shown in FIG. 6, the device includes a wrist-watch 1182. Its wrist-band can be an expansion band or a wrist-watch strap of plastic, leather or woven material. The processor or CPU of the wearable appliance is connected to a radio frequency (RF) transmitter/receiver (such as a Bluetooth device, a Zig bee device, a WiFi device, a WiMAX device, or an 802.X transceiver, among others).*

*The wrist-band further contains an antenna for transmitting or receiving radio frequency signals. The wristband and the antenna inside the band are mechanically coupled to the top and bottom sides of the wrist-watch housing. Further, the antenna is electrically coupled to a radio frequency transmitter and receiver for wireless communications with another computer or another user. Although a wrist-band is disclosed, a number of substitutes may be used, including a belt, a ring holder, a brace, or a bracelet, among other suitable substitutes known to one skilled in the art. The housing contains the processor and associated peripherals to provide the human-machine interface. A display is located on the front section of the housing. A speaker, a microphone, and a plurality of push-button switches and are also located on the front section of housing.*

*In one embodiment, the watch captures voice from the user and transmits the voice over the Zigbee mesh network to a base station.*

In accordance with the present invention, the base station in turn dials out to a 911 emergency service operator.

*The system distinguishes between falls and other types of normal body movement. The system can include detecting a fall and notifying an emergency service automatically without a user pressing a button to call for help.*

*The operation of the system can include wearing a portable unit that captures movements; and sending activity data by the Base Unit over a phone line to the website. The system may track only movement to maintain privacy and independence. The operation may include detecting a fall, sending an alert through a base unit over the phone line.*

In accordance with the present invention, the alert over the phone line is sent to a 911 emergency service operator without utilizing a call dispatch center to do so.

*The system may include capturing movement activities and comparing the movement activities to fall patterns and determining if a fall has occurred. The system can call a designated responder or local emergency services as needed. The call for help can include a current location for the cell phone if the phone has GPS or WiFi assisted positioning system.*

In accordance with the present invention, location information of the portable unit is acquired either form an online mapping website such as Google maps or through triangulation by comparing relative signal strength to nearby cell towers or both.

Once the switch 1 (FIG. 1) is moved into the activated position and a call initiation signal emitted, then either a call is established directly with the 911 emergency service operator from the unit 20 or remote unit 40 as the case may be or via the base station 1390 (FIG. 6).

In one embodiment, the base station 1390 is a plain old telephone service (POTS) telephone base station connected to the wired phone network. In a second embodiment, the base station 1390 can be a cellular telephone connected to a cellular network for voice and data transmission. In a third embodiment, the base station 1390 can be a WiMAX or 802.16 standard base station that can communicate VOIP and data over a wide area network. In one implementation, Zigbee or 802.15 appliances communicate locally and then transmits to the wide area network (WAN) such as the Internet over WiFi or WiMAX. Alternatively, the base station can communicate with the WAN over POTS and a wireless network such as cellular or WiMAX or both.

*A web server coupled to the mesh network and to the POTS to provide information to an authorized remote user. A wireless router coupled to the mesh network and wherein the wireless router comprises one of: 802.11 router, 802.16 router, WiFi router, WiMAX router, Bluetooth router, X10 router. A mesh network appliance coupled to a power line to communicate X10 data to and from the mesh network. The appliance transmits and receives voice from the person over the mesh network. Bioimpedance data can be used to determine one of total body water, compartmentalization of body fluids, cardiac monitoring, blood flow, skinfold thickness, dehydration, blood loss, wound monitoring, ulcer detection, deep vein thrombosis, hypovolemia, hemorrhage, blood loss, heart attack, stroke attack. A patch having second BI or EKG sensor can be in communication with the wireless transceiver. The appliance transmits and receives voice from the person over the mesh network to one of: a doctor, a nurse, a medical assistant, a caregiver, an emergency response unit, a family member.* (1194 of FIG. 6).

Once the call is initiated, voice communications are enabled with the 911 emergency service operator. A conventional global positioning system module receives global coordinate information pertaining to the location of the emergency response unit or device from a conventional global positioning satellite system. During this time, either the unit 20, base station 1390 or portable unit 40 (depending upon which has such capability) contain a location information acquisition module configured to seek to obtain location information based on the global coordinate information by either accessing memory or interfacing with an online location identification service such as Google maps and/or by detecting signal strength with cell tower network devices to effect triangulation and thereby figure out location information or does both. The ascertained location information is sent in the form of a message to the 911 emergency service operator at the end of the call prior to termination of the call. Such a location information module is not part of the disclosure of U.S. Pat. Nos. 8,747,336 B2 or of 9,235, 972 B2. The memory may contain the same content as that of Google maps to correlate global coordinates with location information.

The unit 20, base station 1390 and/or portable unit 40 may also be equipped with a means to enable the user (and perhaps the 911 emergency service operator) to trigger transmission of the message (with ascertained location information) at any time during the call and not just wait until the end of the call. For example, if the unit 10 or remote unit 30 are equipped with a button, slide or lever a touch sensor may be provided so that if the user touches (as opposed to moves) the button, slide or lever, the touch sensor responds by issuing a signal that triggers the transmission of the message containing the location information. Alternatively, a dedicated button, slide or lever can be provided to carry out triggering transmission of the message upon moving such dedicated button, slide or lever.

Further, if either the user of the device or the 911 emergency service operator seek to terminate the call, the unit 20, base station 1390 or remote unit 40 as the case may be equipped so as to prevent the established call with the 911 emergency service operator from terminating just long enough to enable transmission of the identification information to reach the 911 emergency service operator. Thus, if the user moves the switch from the active position to the inactive position, the call terminates only after the message is transmitted that has the ascertained location information. Similarly, if the 911 emergency service operator seeks to terminate the call at their end, the call remains established nonetheless at least until the message is transmitted with the ascertained location information.

The message may be in the form of a street address, town, village or city, county, and state (or Provence) and/or country. Alternatively, a geographical code may be transmitted that is indicative of the street address, town, village or city, county, and state (or Provence) and/or country. The geographical code may be converted by the 911 emergency service operator to the corresponding street address, town, village or city, county, and state (or Provence) and/or country.

III. Preventing Call Termination for a Short Time

The concept of preventing a call termination for a short time is conventional. Such is mentioned, for instance, in U.S. Pat. No. 7,634,255 (255 patent), whose contents are incorporated herein by reference. The '255 patent is directed to a method for reporting activation status of feature service in mobile communication system. According to the '255 patent, the current mobile communication system provides services, such as a termination conversion and transmission rejection service for preventing a call termination to a mobile terminal of the subscriber. Therefore, the subscriber can reduce interruption of a telephone call for a short time.

According to US patent application publication no. 2009/0268606, whose contents are incorporated herein by reference, a Session Initiation Protocol (SIP) network may be enhanced by providing error detection and backup connection techniques in an event errors are detected. A phone call between two or more users, for example, End Users, may be supported using downstream communications and upstream communications via a primary protocol. The ONT(s) associated with the End Users may be configured to identify call parameters in the primary protocol and, based on the parameter, instantiate a backup protocol between the End Users. The primary protocol may be monitored for faults, and in the event a fault occurs, the called can be switched to the backup protocol, thereby preventing the call from being dropped.

Thus, the present invention may incorporate any conventional technique that prevents the dropping of a call for a short time so as to permit the transmission of the message containing the ascertained location information prior to call termination.

What is claimed is:

1. A personal emergency response device, comprising:
   an emergency response unit having:
   a switch movable between active and inactive positions;
   a transmitter to establish a call over a communications network;
   call module means responsive to the switch being in the active position for initiating a call via the transmitter to a 911 emergency service operator directly in a manner that enables voice communication and responsive to the switch being moved into the inactive position for terminating the established call;
   a global positioning means for receiving global coordinate information pertaining to a location of the emergency response unit;
   location means for accessing memory with the received location information that corresponds to the received global coordinate information, the location information being of the emergency response unit;
   message means, which is responsive to retrieval of the location information of the emergency response unit by the location means, for forming a message accordingly that contains the retrieved location information and for sending the message via the transmitter over the communication network to the 911 emergency service operator at least at an end of the initiated call; and
   call termination prevention means for temporarily overriding attempts at ending the call by maintaining the established the call at least until the message is transmitted to the 911 emergency service operator, despite completion of attempts otherwise needed to end the call by movement of the switch from the active position to the inactive position.

2. The device of claim 1, wherein the emergency response unit is configured to communicate with the remote sources wirelessly during the call to ascertain location information of the unit so as to form the message, said remote sources being selected from the group consisting of:
   at least one online mapping Internet site that provides the ascertained location information based on a global positioning system (GPS) tracking module that is configured to receive GPS signals and calculate coordinates accordingly;
   cell tower network devices whose triangulation therewith based on signal strength provides the ascertained location information; and
   any combination thereof.

3. The device of claim 1, wherein the unit has means responsive to manual activation to send the message during the call to the 911 emergency service operator before the end of the call.

4. A personal emergency response device, comprising:
   a remote unit having a switch movable between active and inactive positions and having a transmitter that emits a signal wirelessly in response to the switch moving from the inactive position to the active position; and
   a base station responsive to receipt of the signal to establish a call with a 911 emergency service operator directly so as to enable voice communication over a communication network, the base station being configured to transmit a message to the 911 emergency service operator that contains location information pertaining to at least one of the remote unit and the base station at an end of the call and to prevent the call from terminating prior to transmission of the message to the 911 emergency service operator despite completion of attempts otherwise needed to end the call by moving the switch from the active position to the inactive position and despite efforts by the 911 emergency service operator to terminate the call, at least one of the base station and the remote unit having a global positioning system (GPS) tracking module that is configured to receive GPS signals pertaining to global coordinate information accordingly, the base station being configured to ascertain the location information by accessing memory with the global coordinate information to retrieve the location information that corresponds to the global coordinate information so as to form the message accordingly that contains the location information.

5. The device of claim 4, wherein the base station accesses remote sources wirelessly during the call to ascertain location information of the unit so as to form the message, said remote sources being selected from the group consisting of:
- at least one online mapping Internet site that provides the ascertained location information based on a global positioning system (GPS) tracking module that is configured to receive GPS signals and calculate coordinates accordingly;
- cell tower network devices whose triangulation therewith based on signal strength provides the ascertained location information; and
- any combination thereof.

6. The device of claim 4, wherein at least one of the base station and the remote unit has means responsive to manual activation to trigger sending of the message during the call to the 911 emergency service operator before the end of the call.

* * * * *